(12) United States Patent
Owen

(10) Patent No.: US 10,196,056 B2
(45) Date of Patent: Feb. 5, 2019

(54) CONTROL SYSTEM FOR HYBRID VEHICLE AND METHOD

(71) Applicant: Jaguar Land Rover Limited, Coventry (GB)

(72) Inventor: Simon Owen, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 194 days.

(21) Appl. No.: 15/320,549

(22) PCT Filed: May 20, 2015

(86) PCT No.: PCT/EP2015/061101
§ 371 (c)(1),
(2) Date: Dec. 20, 2016

(87) PCT Pub. No.: WO2015/197268
PCT Pub. Date: Dec. 30, 2015

(65) Prior Publication Data
US 2018/0208178 A1    Jul. 26, 2018

(30) Foreign Application Priority Data
Jun. 23, 2014  (GB) .................................. 1411135.5

(51) Int. Cl.
*B60W 20/00* (2016.01)
*B60W 30/188* (2012.01)
(Continued)

(52) U.S. Cl.
CPC ............. *B60W 20/40* (2013.01); *B60K 6/442* (2013.01); *B60K 6/46* (2013.01); *B60W 10/06* (2013.01);
(Continued)

(58) Field of Classification Search
CPC ...... B60W 20/40; B60W 20/19; B60W 20/10; B60W 10/06; B60W 30/18027; B60W 50/0097; B60K 6/442; B60K 6/46
(Continued)

(56) References Cited

U.S. PATENT DOCUMENTS

| 6,702,052 | B1  |         | 3/2004 | Wakashiro et al.       |
| 7,021,410 | B2  | *       | 4/2006 | Hughes ......... B60K 6/48 |
|           |     |         |        | 180/65.25              |

(Continued)

FOREIGN PATENT DOCUMENTS

| DE | 10 2009 000 720 A1 | 8/2010 |
| EP | 1 826 088 A2       | 8/2007 |
| EP | 2 557 005 A1       | 2/2013 |

OTHER PUBLICATIONS

Combined Search and Examination Report, GB Application No. 1411135.5, dated Dec. 23, 2014, 5 pages.
(Continued)

*Primary Examiner* — John D Walters
(74) *Attorney, Agent, or Firm* — Myers Bigel, P.A.

(57) ABSTRACT

The disclosure relates to a system for controlling a hybrid vehicle having a primary power source such as an electric motor and a secondary power source such as an internal combustion engine, the electric motor and internal combustion engine each being connectable to a driveline of the vehicle. The system comprises a control unit operable to cause the internal combustion engine to be pre-emptively initiated and subsequently connected to the driveline. The control unit is configured and arranged to determine when the vehicle is in a first driving mode (wherein the internal combustion engine is not initiated and is disconnected from the driveline of the vehicle and wherein the electric motor and battery pack are delivering a torque to the driveline in response to a driver demanded torque). The control unit is
(Continued)

further configured and arranged to determine that a steering angle of the vehicle and a situational status of the vehicle are indicative of a driving situation in which an expected driver demanded torque will not be met by the primary power source alone. In response thereto, the control unit is configured and arranged to automatically and pre-emptively cause the internal combustion engine to be initiated and connected to the driveline at a time before the actual driver demanded torque reaches or exceeds said expected driver demanded torque.

20 Claims, 6 Drawing Sheets

(51) Int. Cl.
*B60W 20/40* (2016.01)
*B60W 50/00* (2006.01)
*B60W 10/06* (2006.01)
*B60W 30/18* (2012.01)
*B60W 20/10* (2016.01)
*B60K 6/46* (2007.10)
*B60W 20/19* (2016.01)
*B60K 6/442* (2007.10)
*B60W 10/08* (2006.01)

(52) U.S. Cl.
CPC ............ *B60W 20/10* (2013.01); *B60W 20/19* (2016.01); *B60W 30/18027* (2013.01); *B60W 50/0097* (2013.01); *B60W 10/08* (2013.01); *B60W 20/00* (2013.01); *B60W 2510/0676* (2013.01); *B60W 2520/10* (2013.01); *B60W 2520/16* (2013.01); *B60W 2520/18* (2013.01); *B60W 2530/10* (2013.01); *B60W 2530/22* (2013.01); *B60W 2540/04* (2013.01); *B60W 2540/10* (2013.01); *B60W 2540/106* (2013.01); *B60W 2540/12* (2013.01); *B60W 2540/16* (2013.01); *B60W 2540/18* (2013.01); *B60W 2540/30* (2013.01); *B60W 2550/12* (2013.01); *B60W 2550/13* (2013.01); *B60W 2550/14* (2013.01); *B60W 2550/142* (2013.01); *Y02T 10/6217* (2013.01); *Y02T 10/6291* (2013.01)

(58) Field of Classification Search
USPC ...................................................... 180/65.28
See application file for complete search history.

(56) References Cited

U.S. PATENT DOCUMENTS

| | | | |
|---|---|---|---|
| 8,160,795 B2* | 4/2012 | Iwatsuki | B60W 30/188 701/59 |
| 8,688,299 B2* | 4/2014 | Saito | B60K 6/48 701/22 |
| 8,972,136 B2* | 3/2015 | Yagi | B60K 17/35 701/66 |
| 2004/0099454 A1 | 5/2004 | Hughes | |
| 2008/0275601 A1 | 11/2008 | Saito et al. | |
| 2009/0216415 A1 | 8/2009 | Iwatsuki et al. | |
| 2010/0025131 A1 | 2/2010 | Gloceri et al. | |

OTHER PUBLICATIONS

Notification of Transmittal of the International Search Report and the Written Opinion of the International Searching Authority, or the Declaration, PCT/EP2015/061101, dated Sep. 15, 2015, 7 pages.

* cited by examiner

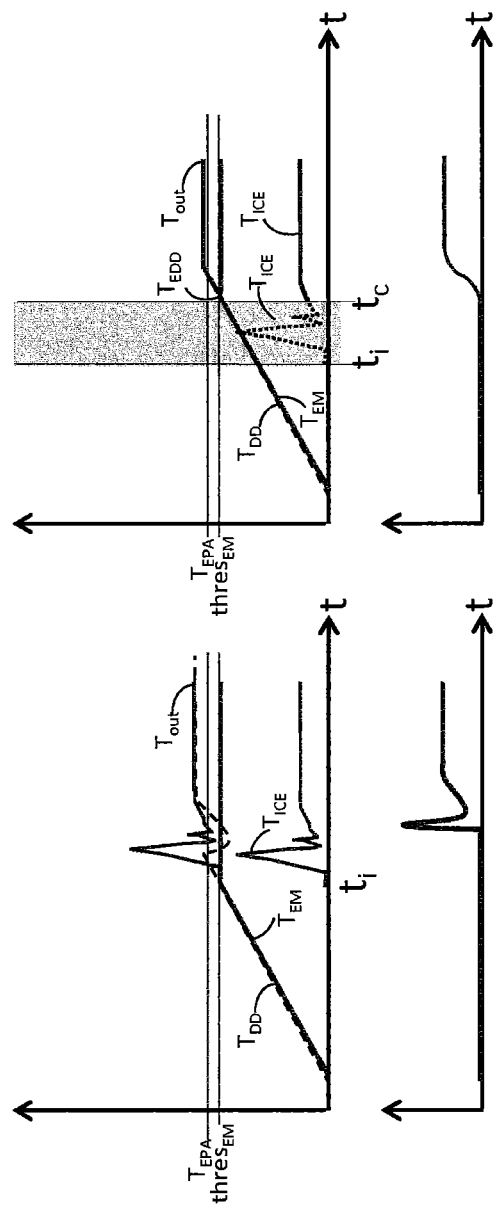

CONTROL SYSTEM FOR HYBRID VEHICLE AND METHOD

RELATED APPLICATIONS

This application is a 35 U.S.C. § 371 national stage application of PCT Application No. PCT/EP2015/061101, filed on May 20, 2015, which claims priority from Great Britain Patent Application No. 1411135.5 filed on Jun. 23, 2014, the contents of which are incorporated herein by reference in their entireties. The above-referenced PCT International Application was published in the English language as International Publication No. WO 2015/197268 A1 on Dec. 30, 2015.

TECHNICAL FIELD

The present invention relates to a system for controlling a hybrid vehicle and to a vehicle comprising such a system particularly, but not exclusively, to a system for controlling a hybrid vehicle which prepares a secondary power source, such as an internal combustion engine, in readiness for providing additional power for a vehicle in dependence upon a situational status of a vehicle and in dependence upon a steering angle of the vehicle.

Aspects of the invention relate to a system, to a vehicle and to a method.

BACKGROUND

In hybrid automotive vehicles comprising a primary power source, such as an electric motor powered by a rechargeable battery pack, and a secondary power source, such as an internal combustion engine (ICE), it is known to provide a system for controlling the initiation of the secondary power source, the ICE. Such control systems are provided to automatically initiate the ICE in situations where the electric motor is not able, on its own, to deliver sufficient drive power (drive torque) for the vehicle. Typically an ICE is automatically initiated in dependence upon a current driver demanded torque and when a driver demanded torque reaches a threshold, the ICE is initiated. In some vehicles an ICE is initiated in dependence upon a current pitch of the vehicle which can be used to determine that the vehicle is, for example, driving up an incline that is considered sufficiently steep that supplementary torque from the secondary power source needs to be delivered.

The present invention seeks to provide an improvement in systems for controlling hybrid vehicles that has particular application for hybrid electric vehicles (HEVs) having a primary electric power source and a secondary internal combustion engine power source. The invention may be utilised in applications other than for hybrid automotive vehicles, and may be utilised in hybrid vehicles having other combinations of power source.

SUMMARY OF THE INVENTION

Aspects of the invention provide a system, a vehicle and a method as claimed in the appended claims.

According to an aspect of the invention for which protection is sought, there is provided a system for controlling a hybrid vehicle having a primary power source and a secondary power source each being connectable to a driveline of the vehicle. The system comprises a control means operable to cause the secondary power source to be pre-emptively initiated and subsequently connected to the driveline. The control means has means for determining that the vehicle is in a first driving mode, wherein the secondary power source is not initiated and/or is disconnected from the driveline of the vehicle and wherein the vehicle is stationary. The control means comprising means for determining that a steering angle of the vehicle and a situational status of the vehicle are indicative of a driving situation in which an expected pull-away torque will not be met by the primary power source alone; and in response thereto, the control means is configured and arranged to automatically and pre-emptively cause the secondary power source to be initiated and/or connected to the driveline at a time before an actual demanded torque reaches or exceeds said expected pull-away torque.

Optionally, the control means automatically and pre-emptively cause the secondary power source to be initiated and/or connected to the driveline in dependence upon one or more or a combination of the following triggers:
(i) a driver input to commence vehicle movement;
(ii) a cruise control system input to commence vehicle movement;
(iii) activation of a means by which a driver of the vehicle can demand torque;
(iv) a decrease of brake pressure below a brake pressure threshold;
(v) a rate of decrease of brake pressure occurring at or above a specified rate of reduction of brake pressure threshold; and
(vi) engagement of a drive gear in an intended direction that corresponds to a drive direction in which the steering angle of the vehicle and a situational status of the vehicle are indicative of a driving situation in which an expected pull-away torque will not be met by the primary power source alone.

Optionally, the control means is configured and arranged:
(i) to determine the situational status of the vehicle;
(ii) to monitor the steering angle of the vehicle;
(iii) to determine an expected time at which an expected pull-away torque will reach or exceed a threshold torque output of the primary power source;
(iv) to determine, in dependence upon: said expected time; said expected pull-away torque; and/or one or more parameters associated with the vehicle or the secondary power source; a suitable time at which the secondary power source is to be automatically initiated; and
(v) in response thereto the control means is configured and arranged to cause the secondary power source to be initiated at said suitable time such that the secondary power source is prepared to deliver an appropriate supplementary output torque at or before said expected time.

Optionally, the secondary power source is engaged to the driveline substantially at or before said expected time such that, at said expected time, an actual total torque output by the secondary power source and the primary power source substantially matches said expected pull-away torque.

Optionally, the vehicle is a hybrid electric vehicle (HEV), the primary power source is an electric motor and the secondary power source is an internal combustion engine (ICE).

Optionally, said situational status of the vehicle is determined in consideration of one or more or any combination of the following:
(i) vehicle drive speed;
(ii) vehicle longitudinal angle of inclination;
(iii) vehicle lateral angle of inclination;
(iv) a combination of longitudinal and lateral angle of inclination of the vehicle;

(v) a correspondence between a vehicle longitudinal angle of inclination and a direction (forward or reverse) of travel or of intended travel of the vehicle;
(vi) a selection of a low range gear;
(vii) a position of an adjustable suspension system or a current ride height; and
(viii) a status of a terrain response mode.

Optionally, said situational status of the vehicle is determined as indicative of a driving situation in which an expected pull-away torque will not be met by the primary power source alone, in consideration of one or more or any combination of the following:
(i) the steering angle of the vehicle being greater than about 90° or less than about −90° (minus ninety degrees);
(ii) the vehicle drive speed being about 0 kmh$^{-1}$;
(iii) the vehicle longitudinal angle of inclination being less than about 10° or greater than about −10° (minus ten degrees);
(iv) the vehicle lateral angle of inclination being less than 7° or greater than −7° (minus seven degrees);
(v) a vehicle longitudinal angle of inclination being less than 7° or greater than −7° (minus seven degrees) and a vehicle lateral angle of inclination being less than 5° or greater than −5° (minus five degrees);
(vi) a correlation between a vehicle longitudinal angle of inclination of less than about 10° or greater than about −10° (minus ten degrees) and the direction (forward or reverse) of travel or of intended travel of the vehicle;
(vii) a selection of a low range gear;
(viii) a high ride height position selection of the adjustable suspension system; and
(ix) the terrain response, automatically or by user selection, being in a rock crawl mode, a grass/gravel/snow mode, or a mud and ruts mode.

Optionally, if the vehicle speed is less than 0.5 kmh$^{-1}$ or substantially about 0 kmh$^{-1}$; and if said steering angle is greater than 90° or less than −90°; and if said vehicle longitudinal angle of inclination is less than 10° or is greater than −10°; and if said direction of travel or intended direction of travel and a vehicle longitudinal angle of inclination correlates to the vehicle being in an uphill situation, then the control means will automatically and pre-emptively cause the secondary power source to be initiated and connected to the driveline at a time before an actual demanded torque reaches or exceeds said expected pull-away torque.

Optionally, the control means is configured to determine said expected pull-away torque in dependence upon any one or a combination of:
(i) the situational status of the vehicle;
(ii) the steering angle or rate of change of steering angle;
(iii) a current driver demanded torque;
(iv) a rate of change of driver demanded torque; and
(v) a driver style model.

Optionally, the control means is configured to determine said suitable time in dependence upon any one or a combination of:
(i) the situational status of the vehicle;
(ii) the steering angle or rate of change of steering angle;
(iii) a temperature of the secondary power source;
(iv) the altitude of the vehicle;
(v) an ambient temperature; and
(vi) an initiation time of the secondary power source.

Optionally, the control means is additionally configured to temporarily increase the threshold torque output of the primary power source.

According to another aspect of the disclosure, there is provided a hybrid electric vehicle comprising: a primary power source in the form of an electric motor; a secondary power source in the form of an internal combustion engine (ICE); and a system according to any of the relevant preceding paragraphs.

According to yet a further aspect of the disclosure, there is provided a method of controlling a hybrid vehicle having a primary power source and a secondary power source each being connectable to a driveline of the vehicle, the method for causing the secondary power source to be pre-emptively initiated and subsequently connected to the driveline, the method comprising:
(i) determining that the vehicle is in a first driving mode, wherein the secondary power source is not initiated and is disconnected from the driveline of the vehicle and wherein the vehicle is stationary;
(ii) determining that a steering angle and a situational status of the vehicle are indicative of a driving situation in which an expected pull-away torque will not be met by the primary power source alone; and in response thereto,
(iii) automatically and pre-emptively causing the secondary power source to be initiated and connected to the driveline at a time before an actual demanded torque reaches or exceeds said expected pull-away torque.

Optionally, the method further comprises:
(i) determining a situational status of the vehicle;
(ii) determining a steering angle of the vehicle;
(iii) determining, in dependence upon the situational status of the vehicle and the steering angle of the vehicle, an expected time at which an expected pull-away torque will reach or exceed an accepted maximum threshold torque output of the primary power source; and
(iv) in dependence upon said expected time, said expected pull-away torque and/or one or more parameters associated with the vehicle or the secondary power source, determining a suitable time, prior to said expected time, to initiate active operation of the secondary power source.

Optionally, the method further comprises: engaging the secondary power source to the driveline substantially at or before said expected time, such that at said expected time, an actual total torque output by the secondary power source and the primary power source substantially matches said expected pull-away torque.

Optionally, the method further comprises: determining said situational status of the vehicle is carried out in consideration of one or more or any combination of the following:
(i) vehicle drive speed;
(ii) vehicle longitudinal angle of inclination;
(iii) vehicle lateral angle of inclination;
(iv) a combination of longitudinal and lateral angle of inclination of the vehicle;
(v) a correspondence between a vehicle longitudinal angle of inclination and a direction (forward or reverse) of travel or of intended travel of the vehicle;
(vi) a selection of a low range gear;
(vii) a position of an adjustable suspension system or a current ride height; and
(viii) a status of a terrain response mode.

Optionally, the method further comprises: determining that said situational status of the vehicle is indicative of a driving situation in which an expected pull-away torque will not be met by the primary power source alone, is carried out in consideration of one or more or any combination of the following:
(i) the steering angle of the vehicle being greater than about 90° or less than about −90° (minus ninety degrees);
(ii) the vehicle drive speed being about 0 kmh$^{-1}$;

(iii) the vehicle longitudinal angle of inclination being less than about 10° or greater than about −10° (minus ten degrees);
(iv) the vehicle lateral angle of inclination being less than 7° or greater than −7° (minus seven degrees);
(v) a vehicle longitudinal angle of inclination being less than 7° or greater than −7° (minus seven degrees) and a vehicle lateral angle of inclination being less than 5° or greater than −5° (minus five degrees);
(vi) a correlation between a vehicle longitudinal angle of inclination of less than about 10° or greater than about −10° (minus ten degrees) and the direction (forward or reverse) of travel or of intended travel of the vehicle;
(vii) a selection of a low range gear;
(viii) a high-ride height position selection of the adjustable suspension system; and
(ix) the terrain response automatically or by user selection being in a rock crawl mode, a grass/gravel/snow mode, or a mud and ruts mode.

Optionally, in the method,
(i) if the vehicle speed is less than 0.5 kmh$^{-1}$ or substantially about 0 kmh$^{-1}$; and
(ii) if said steering angle is greater than 90° or less than −90°; and
(iii) if said vehicle longitudinal angle of inclination is less than 10° or is greater than −10°; and
(iv) if said direction of travel or intended direction of travel and a vehicle longitudinal angle of inclination correlates to the vehicle being in an uphill situation, then, the secondary power source is automatically initiated and connected to the driveline at a time before an actual demanded torque reaches or exceeds the expected pull-away torque.

Optionally, determining said expected pull-away torque is carried out in dependence upon any one or a combination of:
(i) one or more vehicle parameters;
(ii) whether the vehicle is heavily laden and/or towing;
(iii) the situational status of the vehicle;
(iv) the steering angle or rate of change of steering angle;
(v) a current driver demanded torque;
(vi) a rate of change of driver demanded torque; and
(vii) a driver style model.

Optionally, determining said suitable time is carried out in dependence upon any one or a combination of:
(i) the situational status of the vehicle;
(ii) the steering angle or rate of change of steering angle;
(iii) a temperature of the secondary power source;
(iv) an ambient temperature;
(v) the altitude of the vehicle; and
(vi) an initiation time of the secondary power source.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 6A is a graphical representation of a change in total output torque (shown in solid grey line and labelled $T_{OUT}$) that may be delivered by the powertrain of an in-line HEV not having the control system of the present disclosure. A driver demanded torque ($T_{DD}$) is shown in black long-dashed line and, to begin with, varies linearly. An electric motor (EM) delivers an output torque ($T_{EM}$) which provides the total output torque until, at the driver demanded torque ($T_{DD}$) reaches a threshold level (thresh$_{EM}$) at which point an internal combustion engine (ICE) of the HEV is initiated and connected to the driveline to deliver an additional contribution ($T_{ICE}$) to the total output torque. The ICE has an initiation period (Dependent upon environmental factors and does not start immediately. Furthermore, when its first starts, its output torque may not be smooth. During this initiation time, the driver continues to increase the driver demanded torque (because the delivered torque is still insufficient). When the ICE is activated, the total output torque ($T_{OUT}$) causes the vehicle to suddenly accelerate more quickly than intended or required by the driver. The driver responds by reducing the driver demanded torque ($T_{DD}$); once the output torque delivered by the ICE has smoothed out, it enables the total output torque to correspond more closely to the driver demanded torque.
FIG. 6B is a graphical representation of the change in vehicle speed during the time period shown in FIG. 6A. It can be seen that when the ICE is initiated and engaged, the vehicle speed increases rapidly, then decreases rapidly before settling to a steadier speed;
FIG. 7A is a graphical representation of a change in total output torque (shown in solid grey line and labelled $T_{OUT}$) that may be delivered by the powertrain of an in-line HEV according to the disclosure wherein a control system of the present disclosure is implemented. A driver demanded torque ($T_{DD}$) is shown in black long-dashed line and, to begin with, varies linearly. An electric motor (EM) delivers an output torque ($T_{EM}$) which provides the total output torque until, time $t_c$, when the ICE is connected to the driveline. Prior to the ICE being connected, the ICE is initiated at time $t_i$. An initial ramped torque output by the ICE is shown in dotted line during the period when the ICE is not connected. When the actual driver demanded torque ($T_{DD}$) reaches a threshold level (thresh$_{EM}$), the internal combustion engine (ICE) of the HEV is connected to the driveline to deliver an additional contribution ($T_{ICE}$) to the total output torque. The total output torque ($T_{OUT}$) more closely matches the driver demanded torque ($T_{DD}$) and in a substantially smooth manner; the vehicle does not jerk or suddenly accelerate more quickly than required by the driver;
and
FIG. 7B is a graphical representation of the change in vehicle speed during the time period shown in FIG. 7A. It can be seen that the vehicle speed increases gradually and smoothly and enables the driver to creep the vehicle slowly from a stationary position.

DETAILED DESCRIPTION OF EMBODIMENTS

Detailed descriptions of specific embodiments of the systems, vehicles and methods are disclosed herein. It will be understood that the disclosed embodiments are merely examples of the way in which certain aspects of the invention can be implemented and do not represent an exhaustive list of all of the ways the invention may be embodied. Indeed, it will be understood that the systems, vehicles and methods described herein may be embodied in various and alternative forms. The Figures are not necessarily to scale and some features may be exaggerated or minimised to show details of particular components. Well known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
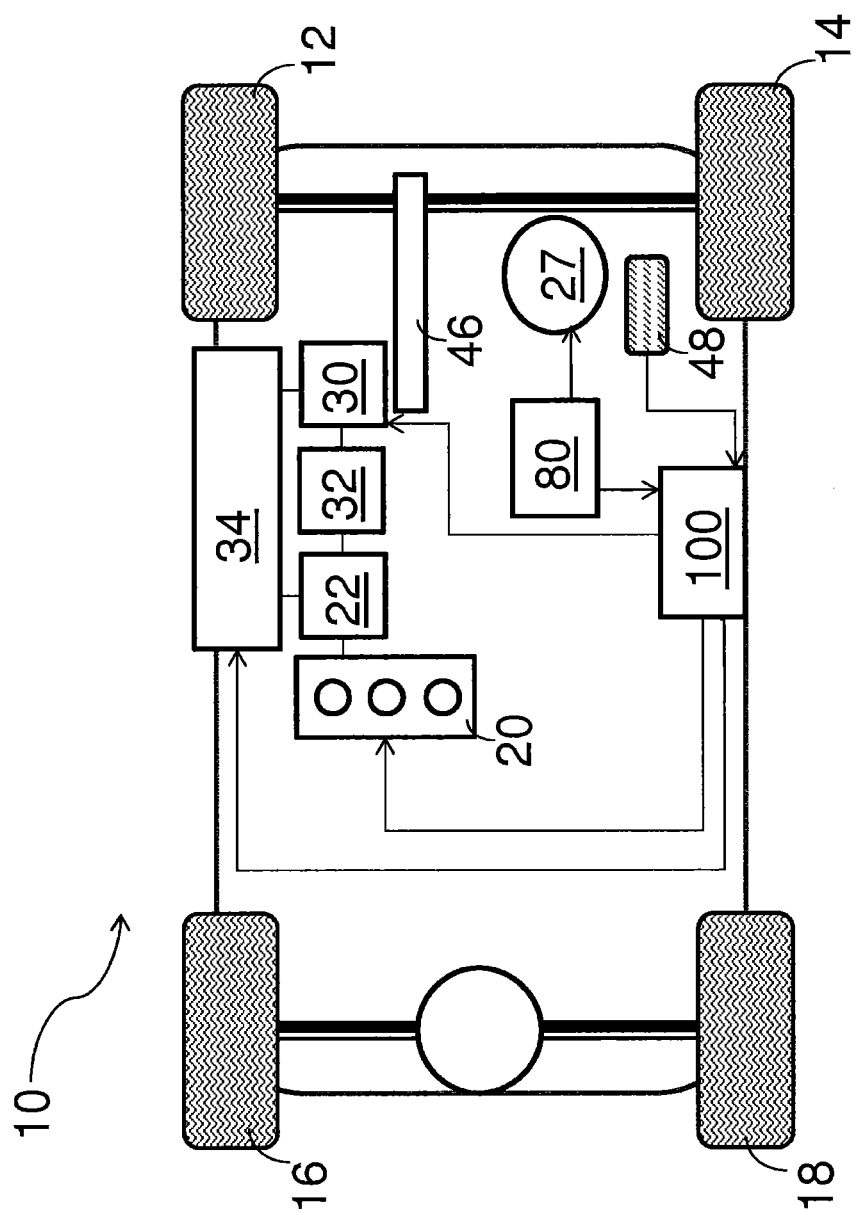
FIG. 1 is a schematic illustration of part of a hybrid vehicle having a control system according to an embodiment of the invention.

In FIG. 1 there is shown a schematic illustration of a vehicle 10. The vehicle 10 has a front left wheel 12, a front right wheel 14, a rear left wheel 16 and a rear right wheel 18. The vehicle is optionally a two-wheel drive (2WD) vehicle 10. The vehicle 10 is a hybrid vehicle 10 meaning that it has two different power sources for propulsion of the vehicle 10. The vehicle 10 comprises a primary power source in the form of an electric motor 30 and a rechargeable battery pack 34; and a secondary power source in the form of an internal combustion engine (ICE) 20. As such the vehicle 10 is a hybrid electric vehicle (HEV). Optionally, the ICE 20 may have a greater maximum torque output than the electric motor 30, as such the "secondary power source", for example the ICE 20 may actually be the "larger" of the two power sources.

In the presently illustrated arrangement, the vehicle 10 is optionally an "in-line" or "series" HEV meaning that the ICE 20 is connectable to a generator 22 which generates electrical energy from the kinetic energy generated by the ICE 20, which is then converted by converter 32 into a direct current (DC) for the electric motor 30, or for storage by the battery pack 34. As such, the ICE 20 is optionally not directly connected to a transmission 46 but is effectively indirectly connectable to the driveline of the vehicle 10 by providing an output torque $T_{ICE}$ to the electric motor 30 (optionally via the generator 22 and battery pack 34). The ICE 20 can be disconnected from the generator 22 and hence from the electric motor 30 and hence from the driveline, by means of a clutch or other releasable torque transmitting means (not shown) optionally provided between the ICE 20 and the generator 22. Optionally the electric motor 30 may be used for recuperation of energy during regenerative braking, as is known.

As is typical with such HEVs, the ICE 20 can be active (i.e. generating an output torque $T_{ICE}$) or inactive (i.e. not generating an output torque). When active, the ICE 20 can be connected to the driveline such that it can deliver the generated output torque ($T_{ICE}$) to the electric motor 30 for propulsion of the vehicle 10; or it can be disconnected from the driveline such that the output torque ($T_{ICE}$) is not delivered to the driveline. Once the vehicle 10 has been started, the electric motor 30 is typically always active and is connected and disconnected to the transmission 46 of the driveline by means of a clutch or other releasable torque transmitting means (not shown).

As is also typical with such HEVs, the vehicle 10 comprises a means 48 by which a driver of the vehicle 10 can demand torque. Optionally, said means 48 takes the form of a foot pedal 48 which may optionally be referred to as a "throttle pedal 48" or "accelerator pedal 48". The means 48 may take other forms, for example a button, actuator, paddle or other human-machine-interfacing element. Where said means 48 is a foot pedal, depression of the foot pedal 48 optionally causes a signal to be issued to a control unit 100 (which may take the form of one or more control units 100 which may also be referred to as "control means" or "control module"). The extent to which the foot pedal 48 is depressed is indicative of the value of driver demanded torque ($T_{DD}$). The magnitude or value of driver demanded torque ($T_{DD}$) varies in dependence upon how the driver is controlling the vehicle 10. The driver demanded torque ($T_{DD}$) is met, in the first instance, by the electric motor 30 (and battery pack 34). If the driver demanded torque ($T_{DD}$) reaches or exceeds a threshold torque level (thresh$_{EM}$) that represents a maximum torque that can be delivered by the electric motor 30 (and battery pack 34), then the ICE 20 is initiated and connected to the driveline in order for a supplementary torque output ($T_{ICE}$) to be delivered.

To enable the driver to control the direction of the vehicle 10 a steering wheel 27 is provided. Optionally, the steering wheel 27 may form part of a steering system, such as an electric power assisted steering system (EPAS) having a control unit 80. The control unit 80 monitors data relating to, among other things, the driver input steering wheel angle α. A driver input steering wheel angle α may be measured by a sensor (not shown) on the steering wheel 27 which may monitor the actual (absolute or relative) position of the steering wheel 27 itself. Additionally or alternatively, input steering wheel angle α may be determined by a sensor (not shown) downstream of the steering wheel 27 and contained within the steering column or other part of the EPAS system. Preferably, a driver required steering wheel angle α as determined by the EPAS system may be conveyed by the control unit 80 to the control unit 100 for the HEV (directly or via a vehicle CAN).

In other embodiments it is envisaged that a means other than a steering wheel may be provided for the driver to control the direction of the vehicle. In some embodiments of the invention the "steering wheel" 27 is a driver (and/or cruise control) operable steering device that is not a steering "wheel" as such. In some arrangements, the operable steering device comprises a joy-stick, a lever steering device (for example a twin-lever device) and other steering devices that may come into use.

Additionally it is envisaged that where an autonomous or semi-autonomous cruise control driving system is provided on a vehicle, a steering angle requirement may be input to a steering system of the vehicle via a control module of the cruise control system rather than by the driver. For example, in a "park-for-you" system, a control module thereof takes over from the driver of the vehicle to park the vehicle and in such circumstances the steering angle α is not necessarily a "steering wheel angle" as such, but a steering angle requirement issued by a control module of the "park-for-you" system.

As used herein the term "steering angle α" is intended to at least cover a steering angle input by an operable steering device that may be measured by a sensor on and/or downstream of the operable steering device, including but not limited to a steering wheel 27; and a steering angle input by a cruise controlling system, such as but not limited to a "park for you" system.

Figure 2:
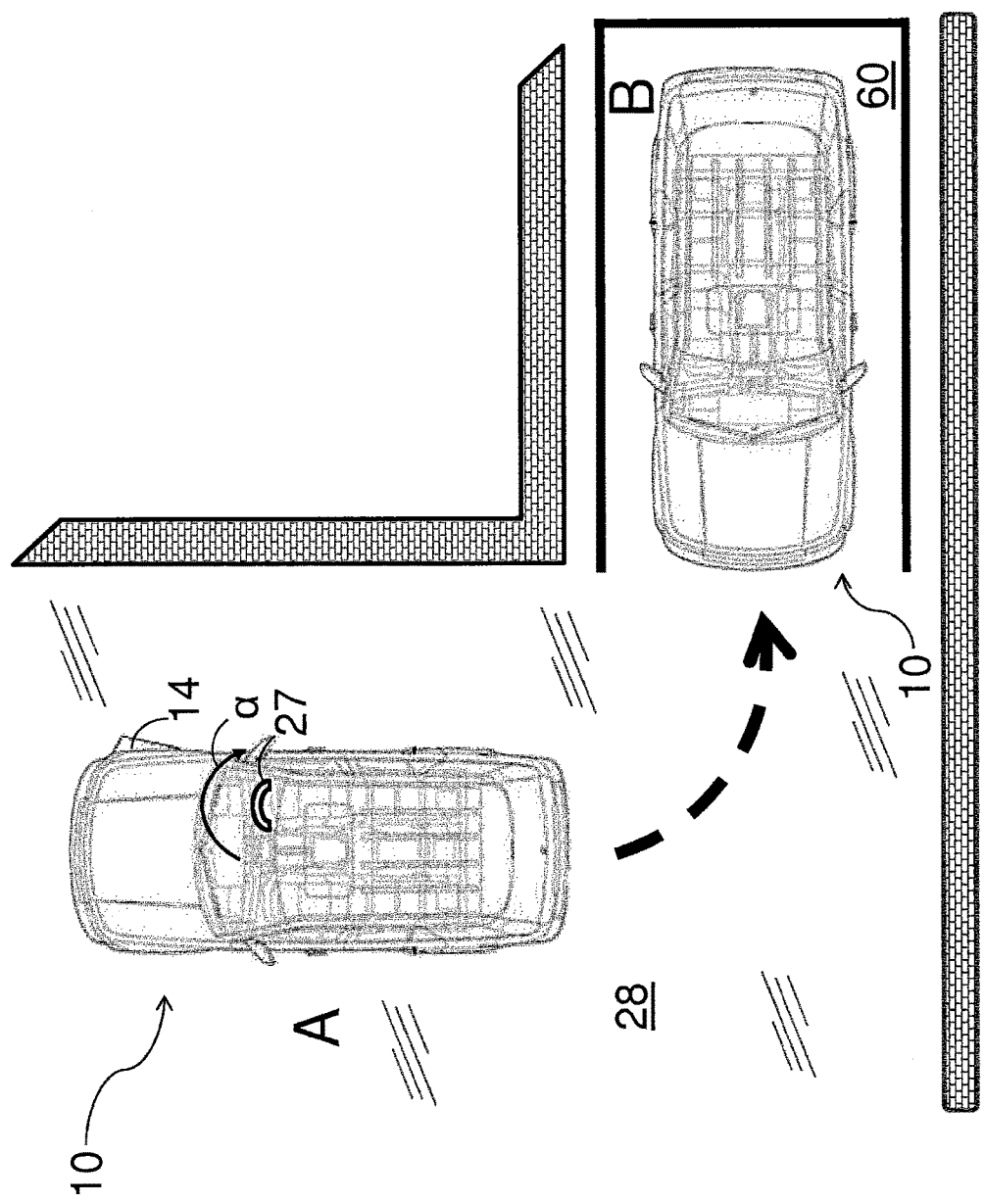
FIG. 2 is a plan view illustration of the vehicle of FIG. 1 in a situation wherein the vehicle is being manoeuvred up a ramp from position A into a parking bay to adopt position B.

It may be that in embodiments the steering angle actually refers to an angle of a road wheel from the 'straight ahead'—such as may be seen in FIG. 2 where the road wheel 14 is non-aligned with the body of the vehicle 10 in the Figure. In such a circumstance a high level of steering may be taken to be, for example, 20 degrees from the 'straight ahead'. It may be useful to measure steering angle in this way as the number of turns 'lock to lock' of a steering wheel can vary considerably from vehicle type to vehicle type, and in fact with modern steering systems the relationship between steering wheel angle and road wheel angle may not be linear or may otherwise vary (such as with speed) in an individual vehicle or vehicle type.

$Thresh_{EM}$ may vary in dependence upon a number of factors that optionally include: the state of health of the battery; the state of charge (SoC) of the battery; the temperature of the battery; and the power consumption being placed on the battery from other components or systems of the vehicle 10 (such as, but not limited to, a heating ventilation and air-conditioning (HVAC) system).

The total torque output ($T_{OUT}$) delivered may be provided entirely by the battery pack 34 and electric motor ($T_{EM}$); or may be provided by both the ICE 20 ($T_{ICE}$) and the battery pack 34 and electric motor 30 ($T_{EM}$).

Beneficially, the present disclosure now provides a system for controlling the hybrid vehicle 10 from a stationary start. It has been observed that known HEVs can cause a starting vehicle to jerk in certain scenarios and the system of the present invention provides for a smoother pull-away of hybrid vehicles. In the presently illustrated arrangement of the disclosure, the system comprises a control unit 100 that is operable to cause the ICE 20 to be pre-emptively initiated and subsequently connected to the driveline in dependence upon a steering angle ($\alpha$) of the vehicle 10 and in dependence upon a situational status of the vehicle 10. In this way supplementary torque can be delivered by the ICE 20 when required because the system recognises that additional torque is going to be required given the circumstances the vehicle 10 is in, and not merely because a driver demanded torque ($T_{DD}$) has reached or exceeded a threshold ($thresh_{EM}$) corresponding to an accepted maximum output torque ($T_{EM}$) of the electric motor 30 and battery pack 34.

By pre-empting that additional torque will need to be delivered and initiating the ICE 20 in readiness to provide it, the total output torque can be controlled such that it is more smooth. In many driving scenarios where additional torque is demanded and the ICE 20 initiated and connected to provide it, a perturbation in the total torque output ($T_{OUT}$) may occur, but this may not be observed by the driver. However, the present disclosure beneficially identifies when a vehicle is in a situation or scenario wherein such a perturbation in the total torque output ($T_{OUT}$) may be observed by the driver and may even cause driver discomfort or in a very worst case, vehicle damage; and provides a control system for minimising or removing such perturbations in the total torque output ($T_{OUT}$), in those scenarios.

It will be appreciated that the methods and control system provided herein are applied when the vehicle 10 is in a first driving mode. In the first driving mode the ICE 20 is not active and/or is disconnected from the driveline of the vehicle 10; the electric motor 30 is active; and the vehicle 10 is stationary. The electric motor 30 may be disconnected from the driveline if the vehicle is stationary; and is selectively connected to the driveline of the vehicle 10 for delivering a torque to the driveline in response to a driver demanded torque ($T_{DD}$). The control unit 100 comprises means to determine that the vehicle 10 is in the first driving mode.

The control unit 100 is further configured and arranged to determine a steering angle ($\alpha$) of the vehicle 10. A steering angle ($\alpha$) may be obtained via a Controller Area Network (CAN) of the vehicle 10, directly from a sensor (not shown) on the vehicle 10 that measures steering angle ($\alpha$) and/or directly from another control unit (not shown) of the vehicle 10, for example an Electronic Power Assisted Steering System (EPAS) controller.

Beneficially, a current steering angle ($\alpha$) is considered by the system of the present disclosure because a driver requirement for a high level of steering lock increases the total torque required to move the vehicle 10. If the vehicle 10 is stationary (i.e. has a vehicle speed ( ) of 0 $kmh^{-1}$), the effect of the high level of steering lock further increases the inertia of the vehicle 10 and hence further increases the total torque required to move the vehicle 10. It will be appreciated that the relationship between an input steering angle $\alpha$ and the actual amount by which the position of the steered road wheels of the vehicle is controlled, may vary from vehicle to vehicle and that different vehicles can have different turning circles. As such, the definition of a "high-degree of steering lock" in terms of steering angle also varies from vehicle to vehicle, though in some arrangements a high level of steering lock may be considered to be a steering angle $\alpha$ above about 90 degrees (in the clockwise direction) and less than about −90 (minus ninety) degrees in the counter-clockwise direction.

The control unit 100 is further configured and arranged to determine a situational status of the vehicle 10 and more particularly to determine that a situational status of the vehicle 10 is indicative of a driving situation in which an expected pull-away torque will not be met by the primary power source 30/34 alone. The expected pull-away torque is the torque required to overcome the inertia of the vehicle 10 to move the vehicle 10 from a stationary starting state and into a moving state. The pull-away torque may vary in dependence upon a number of factors including the situation of the vehicle 10, which may include, for example, whether the vehicle is: going to be driven up-hill, towing, heavily laden, and being driven on difficult terrain.

Upon making a determination that a from stationary vehicle start (pull-away) is required and that the steering angle ($\alpha$) and the situational status of the vehicle 10 indicate that an expected pull-away torque ($T_{EPA}$) will not be met by the electric motor and battery pack 30/34 alone, the control unit 100 is configured and arranged to automatically and pre-emptively cause the ICE 20 to be initiated and then subsequently connected to the driveline (via the releasable torque transmission means (clutch) positioned between the ICE 20 and generator 22) at a time $t_i$. In this way, before an actual demanded torque ($T_{DD}$) (which may be demanded by the driver via said throttle pedal 48 or optionally via a cruise control system) reaches or exceeds the expected pull-away torque ($T_{EPA}$), the ICE 20 is initiated, is outputting a smooth output torque $T_{ICE}$ and is ready to deliver an appropriate value of supplementary output torque $T_{ICE}$.

Figure 3:
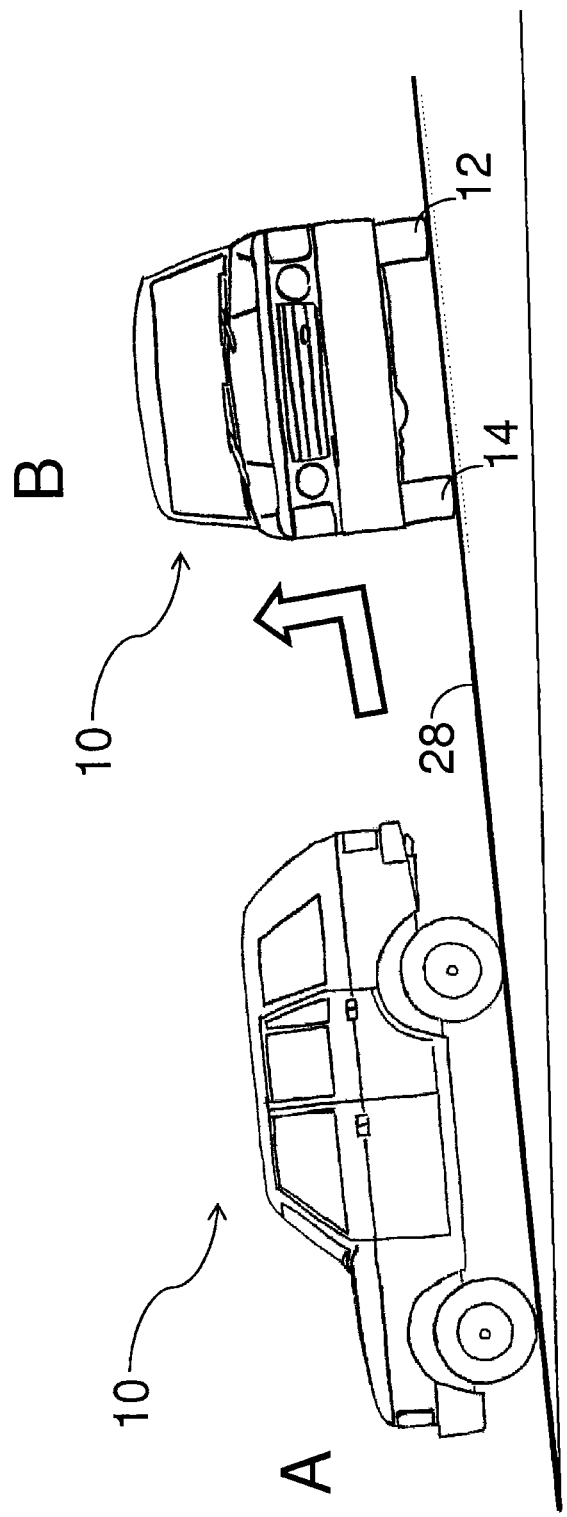
FIG. 3 is a side view of the vehicle of FIG. 1 in a situation wherein the vehicle is being manoeuvred up the ramp from position A into the parking bay to adopt position B.

Reference is now made to FIGS. 2 and 3, wherein a vehicle 10 having the control unit 100 is depicted in a possible driving scenario in which the system of the present disclosure is of benefit. It can be seen in FIGS. 2 and 3 that the vehicle 10 is being moved from position A to position B. The vehicle 10 is being reversed around a tight corner in a car park into parking bay 60. As shown in FIG. 3, the surface 28 of the car park is inclined (optionally by about 12°). As can be seen in FIG. 2, the vehicle 10 is manoeuvred from a stationary (0 kmh$^{-1}$) start, with a high level of clockwise steering lock (for example, a positive (right hand) steering angle of about 90°). The high level of clockwise steering lock is indicated by the arrow denoting the angle α above the steering wheel 27.

The control unit 100 is configured to monitor the status of the ICE 20 and in the scenario depicted the control unit 100 determined that the vehicle 10 is in a first driving mode, wherein the ICE 20 is not connected to the driveline and the vehicle 10 is stationary. In addition, the control unit 100 monitors the steering angle (α) and determines that the current steering angle of about 90° is above a threshold steering angle for the vehicle incline. Furthermore, the control unit monitors the situational status of the vehicle and, based upon the current vehicle speed ( ) of 0 kmh$^{-1}$, engagement of a reverse gear and longitudinal angle of incline (pitch) of +5°, determines that the vehicle 10 is in a driving situation in which an expected pull-away torque ($T_{EPA}$) will not be met by the primary power source 30/34 alone. Upon a decrease of brake pressure or upon an increase in driver demanded torque ($T_{DD}$), the control unit 100 is triggered to automatically and pre-emptively causes the ICE 20 to be initiated so that additional torque can be provided when it is required. The control unit 100 also causes the ICE 20 to be connected to the driveline at a time before the actual driver demanded torque ($T_{DD}$) reaches or exceeds the expected pull-away torque ($T_{EPP}$).

In the presently illustrated embodiment, the control unit 100 automatically and pre-emptively cause the secondary power source to be initiated and/or connected to the driveline in dependence upon one or more or a combination of the triggers. Such triggers include any driver input to commence movement of the vehicle 10, for example engagement of a drive gear and release of brake or activation of a means by which a driver of the vehicle can demand torque, such as, but not limited to depression of the throttle pedal 48.

Triggers incorporating the monitoring of the brake release may consider a decrease of brake pressure below a brake pressure threshold which may be beneficial in scenarios where a driver slowly releases a brake or a rate of decrease of brake pressure occurring at or above a specified rate of reduction of brake pressure threshold which may be beneficial in scenarios where a driver quickly releases the brake pressure. Monitoring of the brake pressure reduction may be carried out in combination with monitoring engagement of a drive gear. In this way, if a driver engages a driver gear in an intended direction of travel that corresponds to a drive direction in which the steering angle of the vehicle and a situational status of the vehicle are indicative of a driving situation in which an expected pull-away torque will not be met by the primary power source alone and brake pressure is reduced, the control means is triggered to automatically and pre-emptively cause the secondary power source to be initiated and/or connected to the driveline. In this way, when the brake pressure is fully released, such that the vehicle 10 can be moved, the ICE 20 is active and connected and prepared to provide the expected pull-away torque required.

In other envisaged embodiments where a cruise control system or parking aid system, such as but not limited to a "a park for you" type system, is present in the vehicle, a cruise control system input to commence vehicle movement may provide another trigger for automatically pre-emptively causing the ICE 20 to be initiated (if inactive) and connected to the driveline.

Figure 4:
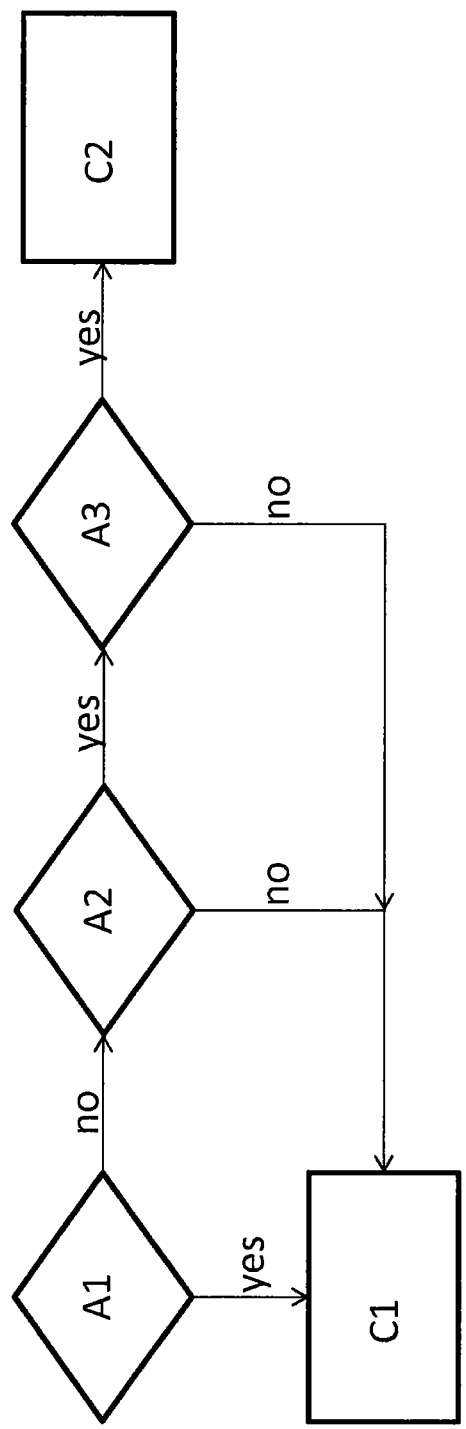
FIG. 4 is a flow diagram illustrating a control method according to an embodiment of the invention.

In the presently illustrated embodiment, the control unit 100 is configured to perform a method which is illustrated schematically in FIG. 4 in conjunction with the following decisions:
Determine whether the vehicle in a first driving mode or not.
    A1: Is the ICE initiated and connected and is the vehicle stationary?
        If Yes→GOTO C1
        If No→GOTO A2
Determine whether the vehicle driving scenario indicates that an expected pull-away torque ($T_{EPA}$) will not be met by the primary power source alone.
    A2: Is the vehicle's situational status quantified as being above an acceptable situational status threshold?
        If Yes→GOTO A3
        If No→GOTO C1
    A3: Is the current (driver demanded) steering angle above a threshold level?
        If Yes→GOTO C2
        If No→GOTO C1
    C1: Driver can progress as normal, no response required. Continue monitoring.
    C2: Activate ICE 20 at time ($t_i$) and connect ICE 20 to driveline at an appropriate time ($t_c$) before the an actual driver demanded torque ($T_{EDD}$) reaches or exceeds the expected pull-away torque (because the expected pull-away torque is equal to or exceeds the maximum output ($T_{EM}$) of the electric motor 30 given the steering lock and situational status).

Figure 5:
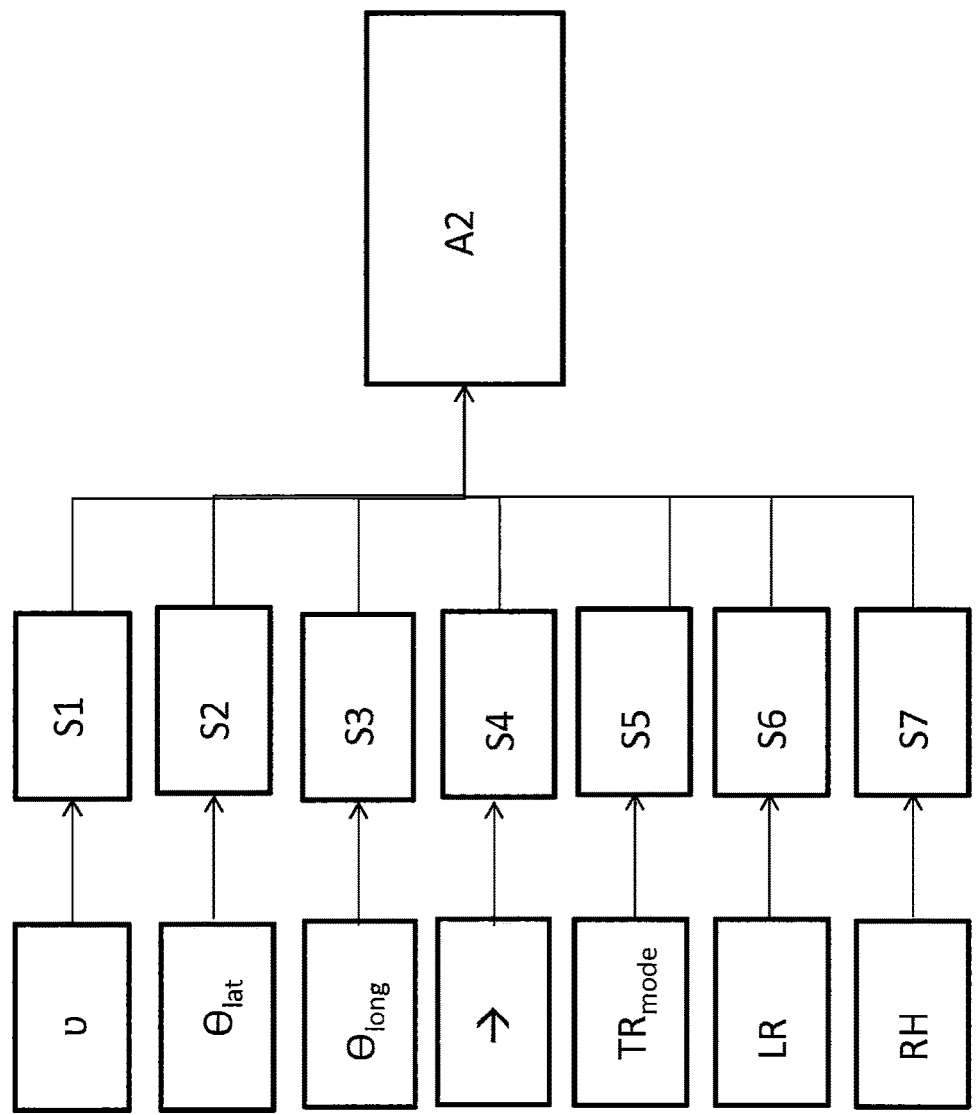
FIG. 5 is a flow diagram illustrating part of the control method of FIG. 2.

Referring to FIG. 5, an example of an algorithm or method of determining or quantifying a situational status of the vehicle 10 is illustrated schematically. It can be seen that one or more variables are input into a decision algorithm. In the present arrangement, the variables optionally include:
(i) Vehicle speed (υ);
(ii) Vehicle lateral angle ($\Theta_{lat}$);
(iii) Vehicle longitudinal angle ($\Theta_{long}$);
(iv) Vehicle forward or reverse direction (→);
(v) One or more outputs from a terrain response system, for example, the adopted terrain response mode (for example: a rock crawl mode, a grass/gravel/snow mode, and a mud and ruts mode);
(vi) Whether a low-range gear selection has been made; and
(vii) Vehicle Ride Height (RH)

Data signals comprising the above variables are available to the control unit 100 via the CAN and/or directly from one or more other control modules, for example a terrain response module.

In assessing the gathered data signals, the control unit 100 in some embodiments attributes a different weighting or importance to certain values; and/or utilises a threshold criteria for other variables. For example, in the present embodiment, the control unit 100 is configured to apply a threshold to vehicle speed ( ) such that if the vehicle speed is above 0 kmh$^{-1}$ (or, for example, above 0.5 kmh$^{-1}$), a flag S1 associated with the variable "vehicle speed ( )" will return a "zero" value; whereas if the vehicle speed is equal to 0 kmh$^{-1}$ (or for example, below 0.5 kmh$^{-1}$), a flag S1 associated with the variable "vehicle speed ( )" will return a "one" value. The value of the flag S1 associated with the variable "vehicle speed ( )" is then summed with other flags associated with the other variables and mathematically combined. The situational status of the vehicle 10 based upon the selected variables is thereby quantified using the flags S1, S2, S3, S4, S5, S6 and S7 associated with the variables: $_{lat}$, $_{long}$, →, TR mode, LR and RH.

Performing the method of FIG. 5 in the driving scenario illustrated by the vehicle 10 in position A in FIGS. 2 and 3, the following assessments and "flag" values S1, S2, S3, S4, S5, S6, S7 would be returned, resulting in a positive determination at A2 that the situational status of the vehicle 10 is quantified as being above an acceptable situational status threshold:

| Assessment of Variable | Variable Value at Vehicle Position 'A' | Flag Value |
|---|---|---|
| If ≤0.5 kmh$^{-1}$ then situation relevant | =0 kmh$^{-1}$ | S1 = 1 |
| If, −7° ≤ $_{lat}$ ≤ 7° then situation relevant | $_{lat}$ ≈ 0° | S2 = 0 |
| If, −10° ≤ $_{long}$ ≤ 10° and if the direction (forward or reverse) of actual travel or of intended travel (indicated by gear selection) of the vehicle correlates to the longitudinal angle then situation relevant. | $l_{ong}$ ≈ −12° and Vehicle in reverse gear (i.e. vehicle intends to move uphill) | S3 + S4 = 1 |
| If the terrain response mode automatically or by user selection is in a rock crawl mode, a grass/gravel/snow mode, or a mud and ruts mode then situation relevant. | In car park, no such terrain response mode has been selected | S5 = 0 |
| Selection of a low range gear | None | S6 = 0 |
| If a high ride height position selection of the adjustable suspension system has been made then situation relevant. | None | S7 = 0 |

Optionally the method of FIG. 4 is arranged such that a "score" of 2 is sufficient to determine that the situational status is above an acceptable threshold.

Then as shown in FIG. 4, the control unit will at step A3 consider the steering angle. Optionally, in the present embodiment, the steering wheel threshold is fixed and if the driver desired steering angle is equal to or greater than 90° or equal to or less than −90° then the threshold level is exceeded. In the driving scenario of FIGS. 2 and 3, this is the case) (α=+90°) and the control unit affirmatively determines that the vehicle driving scenario indicates that an expected pull-away torque (T$_{EPA}$) will not be met by the primary power source 30/34 alone. In response, C2 is actioned and the ICE 20 is activated at time (t$_i$) and connected to the driveline at an appropriate time (t$_c$) before the expected driver demanded torque (T$_{EDD}$) exceeds the maximum output (T$_{EM}$) of the electric motor 30. In envisaged embodiments, the method incorporates the checking for the presence of a trigger, as described above, which may determine the activation time (t$_i$) or appropriate time (t$_c$) at which the ICE 20 is connected to the driveline. In the present embodiment, the driver input trigger is the reduction in brake pressure, which is optionally calibrated to account for altitude. The engine start time will be longer than normal at higher altitudes and so the brake pressure threshold that provides an engine start trigger may be calibrateable such that at higher altitudes, the higher is the brake pressure threshold at which the engine is initiated.

Reference is now made to FIG. 6A which shows a graphical representation of a change in total output torque (shown in solid grey line and labelled T$_{OUT}$) that may be delivered by the powertrain of a vehicle not having the control system of the present disclosure being manoeuvred from position A to position B similar to the manoeuvre shown in FIGS. 2 and 3. An actual driver demanded torque (T$_{DD}$) is shown in black long-dashed line. To move the vehicle uphill, from a stationary position and with a high steering lock, the driver gradually and linearly increases the driver demanded torque (T$_{DD}$). The inertia of the vehicle in this situation and steering angle is high. The electric motor 30 (EM) delivers an output torque (T$_{EM}$) which provides the total output torque. At t$_i$, the driver demanded torque (T$_{DD}$) reaches a threshold level (thresh$_{EM}$) at which point additional torque is required and an internal combustion engine (ICE) of the HEV is initiated and connected to the driveline to deliver an additional contribution (T$_{ICE}$) to the total output torque. The ICE is not initiated instantaneously and during the delay in its activation the driver demands more torque (for example by further depressing the throttle pedal) in order to move the vehicle from stationary. Then, when the ICE is initiated and connected, its output torque is not immediately smooth and a sharp increase in output torque is observed. The sudden increase in total output torque creates a sudden increase in speed (acceleration). The driver quickly compensates, reducing the driver demanded torque (T$_{DD}$). The torque output by the ICE is then smoothed and the driver corrects the driver demanded torque (T$_{DD}$) again. During this process, the total output torque (T$_{OUT}$) exceeds the driver demanded torque (T$_{DD}$) for an instant and causes the vehicle to accelerate more quickly than required by the driver. Although the driver has responded, the vehicle has jerked backwards and a double jerk in the movement of the vehicle may give an impression of lack of control and in some circumstances may even lead to damage to the vehicle. In FIG. 6B, the change in vehicle speed during the initial part of the manoeuvre is shown.

In contrast, implementation of the control unit 100 of the present disclosure in the vehicle 10 shown in FIGS. 2 and 3, results in a different vehicle speed profile and execution of the manoeuvre in a smoother and more controlled manner.

Referring now to FIG. 7A, a graphical representation is shown of a change in total output torque (shown in solid grey line and labelled T$_{OUT}$) that is delivered by the powertrain of the vehicle 10 according to an embodiment of the disclosure. The control system 100 of the present disclosure is implemented. Again, the driver demanded torque (T$_{DD}$) is shown in black long-dashed line and, to begin with, varies linearly. The electric motor 30 delivers an output torque (T$_{EM}$) which provides the total output torque. In consideration of the situation and steering angle, and a trigger (in this example depression of the throttle pedal), the control unit determines an expected pull-away torque (T$_{EDD}$) and based upon a range of vehicle factors, estimates a time when the driver demanded torque (T$_{DD}$) will exceed the threshold level (thresh$_{EM}$) of the electric motor. At an earlier time t$_i$, the ICE 20 is initiated. After a settling period (provided to ensure that the ICE is active and generating a smooth outout) and in time with the actual driver demanded torque (T$_{DD}$) reaching the expected pull-away torque (T$_{EPA}$) at a suitable time t$_c$, the ICE 20 is connected to the driveline of the vehicle 10. As such, prior to the ICE 20 being connected, the ICE is initiated. An initial ramped torque output by the ICE 20 is shown in dotted line during the period (greyed-out) when the ICE 20 is not connected. The initial spike or perturbation in output torque occurs whilst the ICE 20 is disconnected from the driveline. The ICE 20 is only connected once its output is more smooth and as such, when the actual driver demanded torque (T$_{DD}$) reaches the threshold level (thresh$_{EM}$), the internal combustion engine (ICE) of the HEV vehicle 10 is already connected to the driveline to deliver an additional contribution (T$_{ICE}$) to the total output torque. The total output torque (T$_{OUT}$) more closely matches the driver demanded torque ($T_{DD}$) and in a substantially smooth manner. The vehicle 10 does not jerk or suddenly accelerate more quickly than required by the driver. In FIG. 7B a graphical representation is shown of the change in vehicle speed during the time period of FIG. 7A. It can be seen that the vehicle speed increases gradually and smoothly and enables the driver to creep the vehicle 10 slowly from the stationary position, 'A', uphill and around a corner and into parking bay 60.

The control unit 100 is configured to estimate, compute, look up or otherwise determine, a value of expected pull-away torque ($T_{EDD}$) in dependence upon any one or a combination of the following optional and non-limiting parameters/variables:
(i) the situational status of the vehicle;
(ii) the weight of the vehicle and/or a consideration of whether the vehicle is heavily laden (which may take account of the number of passengers) and/or consideration of whether the vehicle is towing;
(iii) the steering angle and/or rate of change of steering angle;
(iv) the current driver demanded torque ($T_{DD}$);
(v) a rate of change of driver demanded torque; and
(vi) a driver style model.

The situational status may be determined as explained above. The current driver demanded torque ($T_{DD}$) can be monitored and traced in real time and where a driver style model has been utilised in the vehicle, the control unit 100 may be able to utilise a learned driver pattern or characteristic to determine, for example, if the driver is more likely to increase the throttle quickly. Then it can be estimated what value of driver demanded torque may be applied, whether this will exceed the maximum output torque ($thresh_{EM}$) of the electric motor 30 and if so, an estimation can be made of a (relative or real) time when that might occur. This may be referred to as an expected time.

In dependence upon the expected time, the expected driver demanded torque $T_{EDD}$ and/or one or more parameters associated with the vehicle 10 or the ICE 20, the control means 100 estimates, computes, looks up or otherwise determines a suitable time ($t_i$) at which the ICE 20 is to be automatically initiated. As shown in FIG. 7A, the control means 100 is configured and arranged to cause the ICE 20 to be initiated at that suitable time ($t_i$) such that the ICE 20 is prepared and is outputting a torque and will be able to deliver an appropriate output torque at or just before said expected time. The ICE 20 is connected to the driveline at a connection time ($t_c$) which is after the initiation time (to allow the output of the ICE 20 to settle) and either at or immediately before the expected time.

The control unit 100 may determine the suitable time in dependence upon any one or a combination of:
(i) the situational status of the vehicle;
(ii) the steering angle or rate of change of steering angle;
(iii) a temperature of the ICE 20;
(vii) an ambient temperature;
(viii) the altitude of the vehicle; and
(iv) an initiation time of the ICE 20.

As shown in FIG. 7A, the ICE 20 is engaged to the driveline of the vehicle 10 at the connection time $t_c$. The connection time $t_c$ is substantially at or before said expected time. In this way, at said expected time, an actual total torque output ($T_{OUT}$) delivered by the ICE 20 and the electric motor 30 substantially matches said expected driver demanded torque $T_{EDD}$.

In this way, the present disclosure enables a vehicle 10 in specific situations where the inertia of the vehicle 10 is relatively high (uphill, stationary start, high level of steering lock, high friction/difficult terrain) to be manoeuvred in a smooth, slow and controlled manner such that the driver can creep the hybrid vehicle 10.

It can be appreciated that various changes may be made within the scope of the present invention, for example, in other embodiments of the invention it is envisaged that the steering angle threshold may vary. For example, in dependence upon the situational status and/or in dependence upon one or more of the variables included in the situational status assessment.

It will be understood that the present invention may be applied to an HEV having a different powertrain and driveline arrangement to that shown. For example, the control system described herein may find beneficial application in other HEVs, for example parallel HEVs, wherein either the primary power source (EM 30) or the secondary power source (ICE 20) can be selected to independently or in combination deliver torque to the driveline of the vehicle. As such a vehicle embodying the invention may have a primary power source and a secondary power source each being selectively connectable directly or indirectly, independently or together, to a driveline of the vehicle.

In some envisaged embodiments, in addition to or in the alternative to initiating the secondary power source, the ICE, the maximum torque output threshold ($thresh_{EM}$) of the primary power source, the electric motor 30, may be temporarily increased. For a short period, for example in the region of about 500 ms to about 100 ms, the maximum torque output threshold ($thresh_{EM}$) of the electric motor 30 may be increased. This may be beneficial for example in scenarios where the delay (crank time) of the ICE is expected to be particularly long, for example due to poor fuel quality. Such an additional, temporary boost to the output torque may be useful in supplementing the total output torque for a short period, while the ICE is initiated and outputs a smooth torque.

As used herein the term "steering angle" may refer to one or more or a combination (e.g. average) of steering angles derived and/or obtained from one or a number of sources within the vehicle. For example, steering angle in some embodiments is derived directly from a sensor positioned on or associated with a means for controlling the steering direction of the vehicle, for example, but not limited to, a steering wheel or steering direction controller of a cruise control or other autonomous driving control system. Alternatively or additionally, one or more measurements of steering angle may be obtained from a sensor associated with an EPAS (electric power assisted steering system), a sensor associated with the steering column of the vehicle and/or, by way of a further non-limiting example only, a sensor associated with the driven wheels of the vehicle.

The following numbered paragraphs contain statements of invention:

1. A system for controlling a hybrid vehicle having a primary power source and a secondary power source each being connectable to a driveline of the vehicle, the system comprising a control unit operable to cause the secondary power source to be pre-emptively initiated and subsequently connected to the driveline, the control unit being configured and arranged to determine that the vehicle is in a first driving mode, wherein the secondary power source is not initiated and/or is disconnected from the driveline of the vehicle, wherein the primary power source is for delivering a torque to the driveline and wherein the vehicle is stationary; the control unit being further configured and arranged to determine that a steering angle of the vehicle and a situational status of the vehicle are indicative of a driving situation in which an expected pull-away torque will not be met by the primary power source alone; and in response thereto, the control unit is configured and arranged to automatically and pre-emptively cause the secondary power source to be initiated and/or connected to the driveline at a time before an actual demanded torque reaches or exceeds said expected pull-away torque.

2. A system according to paragraph 1 wherein, the control unit automatically and pre-emptively cause the secondary power source to be initiated and/or connected to the driveline in dependence upon one or more or a combination of the following triggers:
   (i) a driver input to commence vehicle movement;
   (ii) a cruise control system input to commence vehicle movement;
   (iii) activation of a component using which a driver of the vehicle can demand torque;
   (iv) a decrease of brake pressure below a brake pressure threshold;
   (v) a rate of decrease of brake pressure occurring at or above a specified rate of reduction of brake pressure threshold; and
   (vi) engagement of a drive gear in an intended direction that corresponds to a drive direction in which the steering angle of the vehicle and a situational status of the vehicle are indicative of a driving situation in which an expected pull-away torque will not be met by the primary power source alone.

3. A system according to paragraph 2 wherein the control unit is configured and arranged:
   (i) to determine the situational status of the vehicle;
   (ii) to monitor the steering angle of the vehicle;
   (iii) to determine an expected time at which an expected pull-away torque will reach or exceed a threshold torque output of the primary power source; and
   (iv) to determine, in dependence upon: said expected time; said expected pull-away torque; and/or one or more parameters associated with the vehicle or the secondary power source, a suitable time at which the secondary power source is to be automatically initiated; and
   (v) in response thereto the control unit is configured and arranged to cause the secondary power source to be initiated at said suitable time such that the secondary power source is prepared to deliver an appropriate supplementary output torque at or before said expected time.

4. A system for controlling a hybrid vehicle according to paragraph 3 wherein the secondary power source is engaged to the driveline substantially at or before said expected time such that, at said expected time, an actual total torque output by the secondary power source and the primary power source substantially matches said expected pull-away torque.

5. A system for controlling a hybrid vehicle according to paragraph 4 wherein the vehicle is a hybrid electric vehicle (HEV), wherein the primary power source is an electric motor and wherein the secondary power source is an internal combustion engine (ICE).

6. A system for controlling a hybrid vehicle according to paragraph 4 wherein said situational status of the vehicle is determined in consideration of one or more or any combination of the following:
   (i) vehicle drive speed;
   (ii) vehicle longitudinal angle of inclination;
   (iii) vehicle lateral angle of inclination;
   (iv) a combination of longitudinal and lateral angle of inclination of the vehicle;
   (v) a correspondence between a vehicle longitudinal angle of inclination and a direction (forward or reverse) of travel or of intended travel of the vehicle;
   (vi) a selection of a low range gear;
   (vii) a position of an adjustable suspension system or a current ride height; and
   (viii) a status of a terrain response mode.

7. A system for controlling a hybrid vehicle according to paragraph 6 wherein said situational status of the vehicle is determined as indicative of a driving situation in which an expected pull-away torque will not be met by the primary power source alone, in consideration of one or more or any combination of the following:
   (i) the steering angle of the vehicle being greater than about 90° or less than about −90° (minus ninety degrees);
   (ii) the vehicle drive speed being about 0 kmh$^{-1}$;
   (iii) the vehicle longitudinal angle of inclination being less than about 10° or greater than about −10° (minus ten degrees);
   (iv) vehicle lateral angle of inclination being less than 7° or greater than −7° (minus seven degrees);
   (v) a vehicle longitudinal angle of inclination being less than 7° or greater than −7° (minus seven degrees) and a vehicle lateral angle of inclination being less than 5° or greater than −5° (minus five degrees);
   (vi) a correlation between a vehicle longitudinal angle of inclination of less than about 10° or greater than about −10° (minus ten degrees) and the direction (forward or reverse) of travel or of intended travel of the vehicle;
   (vii) a selection of a low range gear;
   (viii) a high ride height position selection of the adjustable suspension system; and
   (ix) the terrain response automatically or by user selection being in a rock crawl mode, a grass/gravel/snow mode, or a mud and ruts mode.

8. A system for controlling a hybrid vehicle according to paragraph 6, wherein,
   (i) if the vehicle speed is less than 0.5 kmh$^{-1}$ or substantially about 0 kmh$^{-1}$; and
   (ii) if said steering angle is greater than 90° or less than −90°; and
   (iii) if said vehicle longitudinal angle of inclination is less than 10° or is greater than −10°; and
   (iv) if said direction of travel or intended direction of travel and a vehicle longitudinal angle of inclination correlates to the vehicle being in an uphill situation, then the control unit will automatically and pre-emptively cause the secondary power source to be initiated and connected to the driveline at a time before the actual driver demanded torque reaches or exceeds said expected pull-away torque.

9. A system for controlling a hybrid vehicle according to paragraph 8, wherein the control unit is configured to determine said expected pull-away torque in dependence upon any one or a combination of:
   (i) one or more vehicle parameters;
   (ii) whether the vehicle is heavily laden or towing;
   (iii) the situational status of the vehicle;
   (iv) the steering angle or rate of change of the steering angle;
   (v) a current driver demanded torque;
   (vi) a rate of change of driver demanded torque; and
   (vii) a driver style model.

10. A system for controlling a hybrid vehicle according to paragraph 9 when dependent upon paragraph 2, wherein the control unit is configured to determine said suitable time in dependence upon any one or a combination of:
   (i) the situational status of the vehicle;
   (ii) the steering angle or rate of change of steering angle;
   (iii) a temperature of the secondary power source;
   (iv) an ambient temperature;
   (v) the altitude of the vehicle; and
   (vi) an initiation time of the secondary power source.

11. A system for controlling a hybrid vehicle according to paragraph 3 wherein the control unit is additionally configured to temporarily increase the threshold torque output of the primary power source.

12. A hybrid electric vehicle comprising: a primary power source in the form of an electric motor; a secondary power source in the form of an internal combustion engine (ICE); and a system according to paragraph 1.

13. A method of controlling a hybrid vehicle having a primary power source and a secondary power source each being connectable to a driveline of the vehicle, the method for causing the secondary power source to be pre-emptively initiated and subsequently connected to the driveline, the method comprising:
   (i) determining that the vehicle is in a first driving mode, wherein the secondary power source is not initiated and/or is disconnected from the driveline of the vehicle, wherein the primary power source is for delivering a torque to the driveline and wherein the vehicle is stationary;
   (ii) determining that a steering angle and a situational status of the vehicle are indicative of a driving situation in which an expected pull-away torque will not be met by the primary power source alone; and in response thereto,
   (iii) automatically and pre-emptively causing the secondary power source to be initiated and/or connected to the driveline at a time before an actual demanded torque reaches or exceeds said expected pull-away torque.

14. A method of controlling a hybrid vehicle according to paragraph 13, the method comprising automatically and pre-emptively causing the secondary power source to be initiated and/or connected to the driveline in dependence upon one or more or a combination of the following triggers:
   (i) a driver input to commence vehicle movement;
   (ii) a cruise control system input to commence vehicle movement;
   (iii) activation of a means by which a driver of the vehicle can demand torque;
   (iv) a decrease of brake pressure below a brake pressure threshold;
   (v) a rate of decrease of brake pressure occurring at or above a specified rate of reduction of brake pressure threshold; and
   (vi) engagement of a drive gear in an intended direction that corresponds to a drive direction in which the steering angle of the vehicle and a situational status of the vehicle are indicative of a driving situation in which an expected pull-away torque will not be met by the primary power source alone.

15. A method of controlling a hybrid vehicle according to paragraph 14, the method further comprising:
   (i) determining a situational status of the vehicle;
   (ii) determining a steering angle of the vehicle;
   (iii) determining, in dependence upon the situational status of the vehicle and the steering angle of the vehicle, an expected time at which an expected pull-away torque will reach or exceed an accepted maximum threshold torque output of the primary power source; and
   (iv) in dependence upon said expected time, said expected pull-away torque and/or one or more parameters associated with the vehicle or the secondary power source, determining a suitable time, prior to said expected time, to initiate active operation of the secondary power source.

16. A method of controlling a hybrid vehicle according to paragraph 15 comprising engaging the secondary power source to the driveline substantially at or before said expected time, such that at said expected time, an actual total torque output by the secondary power source and the primary power source substantially matches said expected pull-away torque.

17. A method of controlling a hybrid vehicle according to paragraph 16 wherein determining said situational status of the vehicle is carried out in consideration of one or more or any combination of the following:
   (i) vehicle drive speed;
   (ii) vehicle longitudinal angle of inclination;
   (iii) vehicle lateral angle of inclination;
   (iv) a combination of longitudinal and lateral angle of inclination of the vehicle;
   (v) a correspondence between a vehicle longitudinal angle of inclination and a direction (forward or reverse) of travel or of intended travel of the vehicle;
   (vi) a selection of a low range gear;
   (vii) a position of an adjustable suspension system or a current ride height; and
   (viii) a status of a terrain response mode.

18. A method of controlling a hybrid vehicle according to paragraph 17 wherein determining that said situational status of the vehicle is indicative of a driving situation in which an expected pull-away torque will not be met by the primary power source alone is carried out in consideration of one or more or any combination of the following:
   (i) the steering angle of the vehicle being greater than about 90° or less than about −90° (minus ninety degrees);
   (ii) the vehicle drive speed being about 0 kmh$^{-1}$;
   (iii) the vehicle longitudinal angle of inclination being less than about 10° or greater than about −10° (minus ten degrees);
   (iv) the vehicle lateral angle of inclination being less than 7° or greater than −7° (minus seven degrees);
   (v) a vehicle longitudinal angle of inclination being less than 7° or greater than −7° (minus seven degrees) and a vehicle lateral angle of inclination being less than 5° or greater than −5° (minus five degrees);
   (vi) a correlation between a vehicle longitudinal angle of inclination of less than about 10° or greater than about −10° (minus ten degrees) and the direction (forward or reverse) of travel or of intended travel of the vehicle;
   (vii) a selection of a low range gear;
   (viii) a high-ride height position selection of the adjustable suspension system; and
   (ix) the terrain response automatically or by user selection being in a rock crawl mode, a grass/gravel/snow mode, or a mud and ruts mode.

19. A method of controlling a hybrid vehicle according to paragraph 18, wherein,
   (i) if the vehicle speed is less than 0.5 kmh$^{-1}$ or substantially about 0 kmh$^{-1}$; and (ii) if said steering angle is greater than 90° or less than −90°; and
(iii) if said vehicle longitudinal angle of inclination is less than 10° or is greater than −10°; and
(iv) if said direction of travel or intended direction of travel and a vehicle longitudinal angle of inclination correlates to the vehicle being in an uphill situation, then, the secondary power source is automatically initiated and connected to the driveline at a time before an actual demanded torque reaches or exceeds the expected pull-away torque.

20. A method of controlling a hybrid vehicle according to paragraph 19, wherein determining said expected pull-away torque is carried out in dependence upon any one or a combination of:
(i) one or more vehicle parameters;
(ii) whether the vehicle is heavily laden and/or towing;
(iii) the situational status of the vehicle;
(iv) the steering angle or rate of change of steering angle;
(v) a current driver demanded torque;
(vi) a rate of change of driver demanded torque; and
(vii) a driver style model.

The invention claimed is:

1. A system for controlling a hybrid vehicle having a primary power source and a secondary power source, each connectable to a driveline of the vehicle, the system comprising:
a control unit configured to cause the secondary power source to be pre-emptively initiated and subsequently connected to the driveline and configured to determine that the vehicle is in a first driving mode wherein the secondary power source is not initiated and/or is disconnected from the driveline of the vehicle, wherein the primary power source is for delivering a torque to the driveline, and wherein the vehicle is stationary;
wherein the control unit is configured to determine that a steering angle of the vehicle and a situational status of the vehicle are indicative of a driving situation in which an expected pull-away torque will not be met by the primary power source alone, and in response thereto, the control unit is configured to automatically and pre-emptively cause the secondary power source to be initiated and/or connected to the driveline at a time before an actual demanded torque reaches or exceeds said expected pull-away torque.

2. The system of claim 1, wherein the control unit is configured to automatically and preemptively cause the secondary power source to be initiated and/or connected to the driveline in dependence upon one or more of the following triggers:
(i) a driver input to commence vehicle movement;
(ii) a cruise control system input to commence vehicle movement;
(iii) activation of a human-machine-interfacing element by which a driver of the vehicle can demand torque;
(iv) a decrease of brake pressure below a brake pressure threshold;
(v) a rate of decrease of brake pressure occurring at or above a specified rate of reduction of brake pressure threshold; and
(vi) engagement of a drive gear in an intended direction that corresponds to a drive direction in which the steering angle of the vehicle and the situational status of the vehicle are indicative of the driving situation in which the expected pull-away torque will not be met by the primary power source alone.

3. The system of claim 2, wherein the control unit is further configured:
(i) to determine the situational status of the vehicle;
(ii) to monitor the steering angle of the vehicle;
(iii) to determine an expected time at which the expected pull-away torque will exceed a threshold torque output of the primary power source;
(iv) to determine a suitable time at which the secondary power source is to be automatically initiated, in dependence upon: said expected time, said expected pull-away torque, and/or one or more parameters associated with the vehicle or the secondary power source, and, in response thereto, the control unit is configured to cause the secondary power source to be initiated at said suitable time such that the secondary power source is prepared to deliver an appropriate supplementary output torque at or before said expected time;
wherein the control unit is configured to determine said suitable time in dependence on one or more of the following: the situational status of the vehicle, the steering angle or a rate of change of the steering angle, a temperature of the secondary power source, an ambient temperature, an altitude of the vehicle, and an initiation time of the secondary power source.

4. The system of claim 3, wherein the secondary power source is engaged to the driveline substantially at or before said expected time, such that at said expected time, an actual total torque output by the secondary power source and the primary power source substantially matches said expected pull-away torque.

5. The system of claim 3, wherein the control unit is configured to determine said expected pull-away torque in dependence upon one or more of:
(i) the one or more parameters associated with the vehicle;
(ii) whether the vehicle is heavily laden and/or towing;
(iii) the situational status of the vehicle;
(iv) the steering angle or rate of change of steering angle;
(v) a current driver demanded torque;
(vi) a rate of change of driver demanded torque; and
(vii) a driver style model.

6. The system of claim 3, wherein the control unit is further configured to temporarily increase the threshold torque output of the primary power source.

7. The system of claim 1, wherein the vehicle is a hybrid electric vehicle, wherein the primary power source is an electric motor and wherein the secondary power source is an internal combustion engine.

8. The system of claim 1, wherein said situational status of the vehicle is determined in consideration of one or more of the following:
(i) vehicle drive speed;
(ii) vehicle longitudinal angle of inclination;
(iii) vehicle lateral angle of inclination;
(iv) a combination of longitudinal and lateral angle of inclination of the vehicle;
(v) a correspondence between a vehicle longitudinal angle of inclination and a direction of travel or of intended travel of the vehicle;
(vi) a selection of a low range gear;
(vii) a position of an adjustable suspension system or a current ride height; and
(viii) a status of a terrain response mode.

9. The system of claim 8, wherein said situational status of the vehicle is determined as indicative of the driving situation in which the expected pull-away torque will not be met by the primary power source alone, in consideration of one or more of the following:

(i) the steering angle of the vehicle being greater than about 90° or less than about −90';
(ii) the vehicle drive speed being about 0 kmh$^{-1}$;
(iii) the vehicle longitudinal angle of inclination being less than about 10° or greater than about −10°;
(iv) the vehicle lateral angle of inclination being less than 7° or greater than −7';
(v) the vehicle longitudinal angle of inclination being less than 7° or greater than −7° and the vehicle lateral angle of inclination being less than 5° or greater than −5°;
(vi) the correspondence between a vehicle longitudinal angle of inclination of less than about 10° or greater than about −10° and the direction of travel or of intended travel of the vehicle;
(vii) the selection of a low range gear;
(viii) a high-ride height position selection of the adjustable suspension system; and
(ix) the terrain response mode being in a rock crawl mode, a grass/gravel/snow mode, or a mud and ruts mode.

10. The system of claim 8, wherein:
(i) if the vehicle speed is less than 0.5 kmh$^{-1}$ or substantially about 0 kmh$^{-1}$; and
(ii) if said steering angle is greater than 90° or less than −90°; and
(iii) if said vehicle longitudinal angle of inclination is less than 10° or is greater than −10°; and
(iv) if said direction of travel or intended direction of travel and the vehicle longitudinal angle of inclination correlates to the vehicle being in an uphill situation,
then, the control unit will automatically and pre-emptively cause the secondary power source to be initiated and connected to the driveline at a time before an actual demanded torque reaches or exceeds said expected pull-away torque.

11. A hybrid electric vehicle comprising:
a primary power source in the form of an electric motor;
a secondary power source in the form of an internal combustion engine; and
a system for controlling the hybrid electric vehicle according to claim 1.

12. A method of controlling a hybrid vehicle having a primary power source and a secondary power source, each being connectable to a driveline of the vehicle, the method comprising:
(i) determining that the vehicle is in a first driving mode, wherein the secondary power source is not initiated and/or is disconnected from the driveline of the vehicle and wherein the vehicle is stationary;
(ii) determining that a steering angle and a situational status of the vehicle are indicative of a driving situation in which an expected pull-away torque will not be met by the primary power source alone; and in response thereto,
(iii) automatically and pre-emptively causing the secondary power source to be initiated and connected to the driveline at a time before an actual demanded torque reaches or exceeds said expected pull-away torque.

13. The method of claim 12, wherein automatically and pre-emptively causing the secondary power source to be initiated and/or connected to the driveline is performed in dependence upon one or more of the following triggers:
(i) a driver input to commence vehicle movement;
(ii) a cruise control system input to commence vehicle movement;
(iii) activation of a human-machine-interfacing element by which a driver of the vehicle can demand torque;
(iv) a decrease of brake pressure below a brake pressure threshold;
(v) a rate of decrease of brake pressure occurring at or above a specified rate of reduction of brake pressure threshold; and
(vi) engagement of a drive gear in an intended direction that corresponds to a drive direction in which the steering angle of the vehicle and a situational status of the vehicle are indicative of a driving situation in which an expected pull-away torque will not be met by the primary power source alone.

14. The method of claim 12, further comprising:
(i) determining the situational status of the vehicle;
(ii) determining the steering angle of the vehicle;
(iii) determining, in dependence upon the situational status of the vehicle and the steering angle of the vehicle, an expected time at which the expected pull-away torque will reach or exceed an accepted maximum threshold torque output of the primary power source; and
(iv) in dependence upon said expected time, said expected pull-away torque and/or one or more parameters associated with the vehicle or the secondary power source, determining a suitable time, prior to said expected time, to initiate active operation of the secondary power source.

15. The method of claim 14, further comprising engaging the secondary power source to the driveline substantially at or before said expected time, such that at said expected time, an actual total torque output by the secondary power source and the primary power source substantially matches said expected pull-away torque.

16. The method of claim 14, wherein determining said suitable time is carried out in dependence upon one or more of:
(i) the situational status of the vehicle;
(ii) the steering angle or rate of change of steering angle;
(iii) a temperature of the secondary power source;
(iv) an ambient temperature;
(v) the altitude of the vehicle; and
(vi) an initiation time of the secondary power source.

17. The method of claim 12, wherein determining said situational status of the vehicle is carried out in consideration of one or more of the following:
(i) vehicle drive speed;
(ii) vehicle longitudinal angle of inclination;
(iii) vehicle lateral angle of inclination;
(iv) a combination of longitudinal and lateral angle of inclination of the vehicle;
(v) a correspondence between a vehicle longitudinal angle of inclination and a direction of travel or of intended travel of the vehicle;
(vi) a selection of a low range gear;
(vii) a position of an adjustable suspension system or a current ride height; and
(viii) a status of a terrain response mode.

18. The method of claim 17, wherein determining said situational status of the vehicle is carried out in consideration of one or more of the following:
(i) a steering angle of the vehicle being greater than about 90° or less than about −90°;
(ii) the vehicle drive speed being about 0 kmh$^{-1}$;
(iii) the vehicle longitudinal angle of inclination being less than about 10° or greater than about −10°;
(iv) the vehicle lateral angle of inclination being less than 7° or greater than −7°;

(v) the vehicle longitudinal angle of inclination being less than 7° or greater than −7° and the vehicle lateral angle of inclination being less than 5° or greater than −5°;
(vi) the correspondence between the vehicle longitudinal angle of inclination of less than about 10° or greater than about −10° and a direction of travel or of intended travel of the vehicle;
(vii) the selection of a low range gear;
(viii) the position of the current high-ride height of the adjustable suspension system;
(ix) the terrain response mode being in a rock crawl mode, a grass/gravel/snow mode, or a mud and ruts mode.

19. The method of claim 18, wherein:
(i) if the vehicle speed is less than 0.5 kmh$^{-1}$ or substantially about 0 kmh$^{-1}$; and
(ii) if said steering angle is greater than 90° or less than −90°; and
(iii) if said vehicle longitudinal angle of inclination is less than 10° or is greater than −10°; and
(iv) if said direction of travel or intended direction of travel and the vehicle longitudinal angle of inclination correlates to the vehicle being in an uphill situation,
then, the secondary power source is automatically initiated and connected to the driveline at a time before an actual demanded torque reaches or exceeds the expected pull-away torque.

20. The method of claim 19, further comprising determining said expected pull-away torque in dependence upon one or more of:
(i) one or more vehicle parameters;
(ii) whether the vehicle is heavily laden and/or towing;
(iii) the situational status of the vehicle;
(iv) the steering angle or rate of change of steering angle;
(v) a current driver demanded torque;
(vi) a rate of change of driver demanded torque; and
(vii) a driver style model.

* * * * *

UNITED STATES PATENT AND TRADEMARK OFFICE
CERTIFICATE OF CORRECTION

PATENT NO.         : 10,196,056 B2
APPLICATION NO.    : 15/320549
DATED              : February 5, 2019
INVENTOR(S)        : Simon Owen Page 1 of 1

It is certified that error appears in the above-identified patent and that said Letters Patent is hereby corrected as shown below:

In the Claims

Column 23, Claim 9, Line 7: Please correct "-7';" to read -- -7°; --

Signed and Sealed this
Seventh Day of May, 2019

Andrei Iancu
*Director of the United States Patent and Trademark Office*